United States Patent
Lu et al.

(10) Patent No.: US 10,870,165 B2
(45) Date of Patent: Dec. 22, 2020

(54) MOBILE FLASH BUTT WELDING METHOD FOR 136RE+SS HEAT-TREATED RAIL

(71) Applicant: Pangang Group Research Institute Co., Ltd., Chengdu (CN)

(72) Inventors: Xin Lu, Chengdu (CN); Dadong Li, Chengdu (CN); Ruoyu Wang, Chengdu (CN); Wei Bai, Chengdu (CN); Jian Deng, Chengdu (CN); Feixiang Xu, Chengdu (CN)

(73) Assignee: Pangang Group Research Institute Co., Ltd., Chengdu (CN)

( * ) Notice: Subject to any disclaimer, the term of this patent is extended or adjusted under 35 U.S.C. 154(b) by 246 days.

(21) Appl. No.: 16/111,821

(22) Filed: Aug. 24, 2018

(65) Prior Publication Data
US 2019/0061041 A1    Feb. 28, 2019

(30) Foreign Application Priority Data
Aug. 31, 2017    (CN) .......................... 2017 1 0771298

(51) Int. Cl.
*B23K 11/04*    (2006.01)
*E01B 29/44*    (2006.01)
(Continued)

(52) U.S. Cl.
CPC ............... *B23K 11/04* (2013.01); *C21D 9/50* (2013.01); *E01B 29/44* (2013.01); *B23K 2101/26* (2018.08); *C21D 9/04* (2013.01)

(58) Field of Classification Search
CPC ...... B23K 11/04; B23K 2101/26; C21D 9/04; C21D 9/50; E01B 29/44
(Continued)

(56) References Cited

U.S. PATENT DOCUMENTS

| 4,933,024 | A | * | 6/1990 | Fukuda | .................... C21D 9/04 148/584 |
| 5,270,514 | A | * | 12/1993 | Wechselberger | .... B23K 11/046 219/100 |

(Continued)

OTHER PUBLICATIONS

Translation CN 406 (Year: 2020).*
(Continued)

*Primary Examiner* — Ibrahime A Abraham
*Assistant Examiner* — Frederick F Calvetti
(74) *Attorney, Agent, or Firm* — Caesar Rivise, PC

(57) ABSTRACT

The invention discloses a mobile flash butt welding method for 136RE+SS heat-treated rail, and particularly a mobile flash butt welding method for 136RE+SS heat-treated rail in the technical field of rail welding. The mobile flash butt welding method for 136RE+SS heat-treated rail in the invention includes a pre-flash stage, a flash stage, a boost stage, an upset stage and a forge stage, with a total heat input of 7.1 MJ-10.0 MJ, a total duration of 110 s-135 s and an upsetting distance of 12.8 mm-16.7 mm during the welding process. By adopting the method of the invention, mobile flash butt welding can be conducted for 136RE+SS heat-treated rail successfully, and the rail joint has less internal defects but stable welding quality, and can pass fatigue test, tensile test and slow bend test to meet the requirements. Besides, the rail joint can pass the drop weight test for 15 welds continuously, demonstrating better stability.

4 Claims, 2 Drawing Sheets

(51) Int. Cl.
  *C21D 9/50* (2006.01)
  *C21D 9/04* (2006.01)
  *B23K 101/26* (2006.01)

(58) Field of Classification Search
  USPC .............................. 219/53, 54, 55, 97, 100
  See application file for complete search history.

(56) References Cited

U.S. PATENT DOCUMENTS

| | | | | |
|---|---|---|---|---|
| 5,632,508 A * | 5/1997 | Jacobs | ................. | B21D 26/033 |
| | | | | 280/781 |
| 7,416,622 B2 * | 8/2008 | Kuppers | .................. | C21D 1/84 |
| | | | | 148/569 |
| RE42,668 E * | 9/2011 | Ueda | ........................ | C21D 1/84 |
| | | | | 148/581 |
| 8,241,442 B2 * | 8/2012 | Bramfitt | ................ | C22C 38/001 |
| | | | | 148/681 |
| 9,394,581 B2 * | 7/2016 | Han | ......................... | C21D 9/04 |
| 9,476,107 B2 * | 10/2016 | Bramfitt | ................... | C21D 9/04 |
| 9,617,690 B2 * | 4/2017 | Saita | ....................... | B23K 11/04 |
| 2008/0060726 A1 * | 3/2008 | Zhan | ......................... | C21D 9/04 |
| | | | | 148/581 |
| 2012/0298263 A1 * | 11/2012 | Bramfitt | .................. | C22C 38/14 |
| | | | | 148/320 |
| 2014/0102603 A1 * | 4/2014 | Han | ......................... | C21D 9/04 |
| | | | | 148/581 |
| 2016/0010188 A1 * | 1/2016 | Han | ........................ | C22C 38/24 |
| | | | | 148/582 |
| 2016/0040263 A1 * | 2/2016 | Okushiro | ................ | C22C 38/00 |
| | | | | 148/581 |
| 2017/0044721 A1 * | 2/2017 | Han | ......................... | C22C 38/02 |
| 2019/0105694 A1 * | 4/2019 | Han | ......................... | B21B 1/22 |
| 2019/0106762 A1 * | 4/2019 | Okushiro | ................ | C22C 38/24 |

OTHER PUBLICATIONS

Translation CN 863 (Year: 2020).*
CN107214406 (Year: 2017).*
CN106334863 (Year: 2017).*

* cited by examiner

MOBILE FLASH BUTT WELDING METHOD FOR 136RE+SS HEAT-TREATED RAIL

FIELD OF THE INVENTION

The invention relates to a mobile flash butt welding method for 136RE+SS heat-treated rail, and particularly to a mobile flash butt welding method for 136RE+SS heat-treated rail in the technical field of rail welding.

BACKGROUND OF THE INVENTION

With the day-by-day severeness of the heavy-haul requirement and the increase of axle load of railway in various countries, steel rail is required to possess stronger wear resistance, i.e. higher hardness. Edited by American Railway Engineering and Maintenance-of-Way Association (hereinafter referred to as AREMA), AREMA Manual is an industrial standard for guiding the design, maintenance and repair of railway structures and parts. Since its first edition in 1905, AREMA Manual has gone through continuous updates and has become an influential industrial standard in North America and even the world. As a rail with standard AREMA strength, 136RE+SS heat-treated rail is made of a high-carbon Cr-containing steel, in which Cr and Fe form a continuous solid solution and further form a variety of carbides with carbon. As a result, it is possible to improve strength and wear resistance of steel, increase hardenability and improve oxidation resistance and corrosion resistance. The hardness of such rail is higher than that of U71 Mn rail, in which Cr is a residual element with a content not exceeding 0.15%. SS heat-treated rail has high tensile strength (about 1000-1200 MPa) and high hardness (about 390-410 HV). Therefore, it is difficult to ensure the joint quality and pass the drop weight test due to the improper welding parameters in the mobile flash butt welding process. The improper welding parameters are inclined to result in excessive width of heat-affected zone and excessive width of softened zone, or to produce martensite structure, seriously affecting properties of the joint. Therefore, in prior art, no mobile flash welding method for 136RE+SS heat-treated rail appears to improve welding quality by controlling heat input and welding duration.

SUMMARY OF THE INVENTION

The invention provides a mobile flash butt welding method for 136RE+SS heat-treated rail which can effectively avoid the internal defects in rail joint and improve the stability of welding quality significantly.

The mobile flash butt welding method for 136RE+SS heat-treated rail in the invention for coping with the above problems comprises a pre-flash stage, a flash stage, a boost stage, an upset stage and a forge stage, with a total heat input of 7.1 MJ-10.0 MJ, a total duration of 110 s-135 s and an upsetting distance of 12.8 mm-16.7 mm in the welding process; wherein, in the pre-flash stage, the heat input is 1.9 MJ-2.2 MJ, the distance is 0.1 mm-1.2 mm and the duration is 22.5 s-25 s; in flash stage, the heat input is 5.0 MJ-6.0 MJ, the distance is 1.0 mm-5.0 mm and the duration is 48.0 s-52.0 s; in the boost stage, the heat input is 0.3 MJ-1.2 MJ, the distance is 13.1 mm-15.2 mm and the duration is 29.5 s-32.0 s; in the upset stage, the heat input is 0.1 MJ-0.3 MJ, the distance is 13.7 mm-16.0 mm and the duration is 2.0 s-9.9 s; and in the forge stage, the duration is 12.8 s-14.5 s.

Furthermore, the holding force is 25 t-35 t in the forge stage.

Furthermore, heat treatment can be further carried out for the welds after welding.

Furthermore, during the heat treatment, the welded joint produced after welding is cooled down to below 400° C. in the first time, then heated to 860° C.-940° C., and then cooled until the temperature of the rail running surface of the weld is between 410° C.-450° C. in the second time.

The beneficial effects of the invention are those: the method in the Application is able to improve the welding quality of rail by controlling the total heat input, the heat input and the duration in each of the four stages, i.e., the pre-flash stage, the flash stage, the boost and the upset stage. By adopting the method of the invention, mobile flash butt welding can be conducted for 136RE+SS heat-treated rail successfully, and the rail joint has less internal defects but stable welding quality, and can pass fatigue test, tensile test and slow bend test to meet the requirements. Besides, the rail joint can pass the drop weight test for 15 welds continuously, demonstrating better stability.

DETAILED DESCRIPTION OF THE PREFERRED EMBODIMENTS

The invention is further described in combination with the drawings as follows.

The mobile flash butt welding method for 136RE+SS heat-treated rail in the application comprises a pre-flash stage, a flash stage, a boost stage, an upset stage and a forge stage, with a total heat input of 7.1 MJ-10.0 MJ, a total duration of 110 s-135 s and an upsetting distance of 12.8 mm-16.7 mm during the welding process; wherein, in the pre-flash stage, the heat input is 1.9 MJ-2.2 MJ, the distance is 0.1 mm-1.2 mm and the duration is 22.5 s-25 s; in the flash stage, the heat input is 5.0 MJ-6.0 MJ, the distance is 1.0 mm-5.0 mm and the duration is 48.0 s-52.0 s; in the boost stage, the heat input is 0.3 MJ-1.2 MJ, the distance is 13.1 mm-15.2 mm and the duration is 29.5 s-32.0 s; in the upset stage, the heat input is 0.1 MJ-0.3 MJ, the distance is 13.7 mm-16.0 mm and the duration is 2.0 s-9.9 s; and in the forge stage, the duration is 12.8 s-14.5 s. The method in the application is able to improve the welding quality of rail by controlling the total heat input, the heat input and the duration in each of the four stages, i.e., the pre-flash stage, the flash stage, the boost stage and the upset stage. By adopting the method of the invention, mobile flash butt welding can be conducted for 136RE+SS heat-treated rail successfully, and the rail joint has less internal defects but stable welding quality, and can meet the requirement by passing fatigue test, tensile test and slow bend test. Besides, the rail joint can pass the drop weight test for 15 welds continuously, demonstrating better stability.

Figure 1:
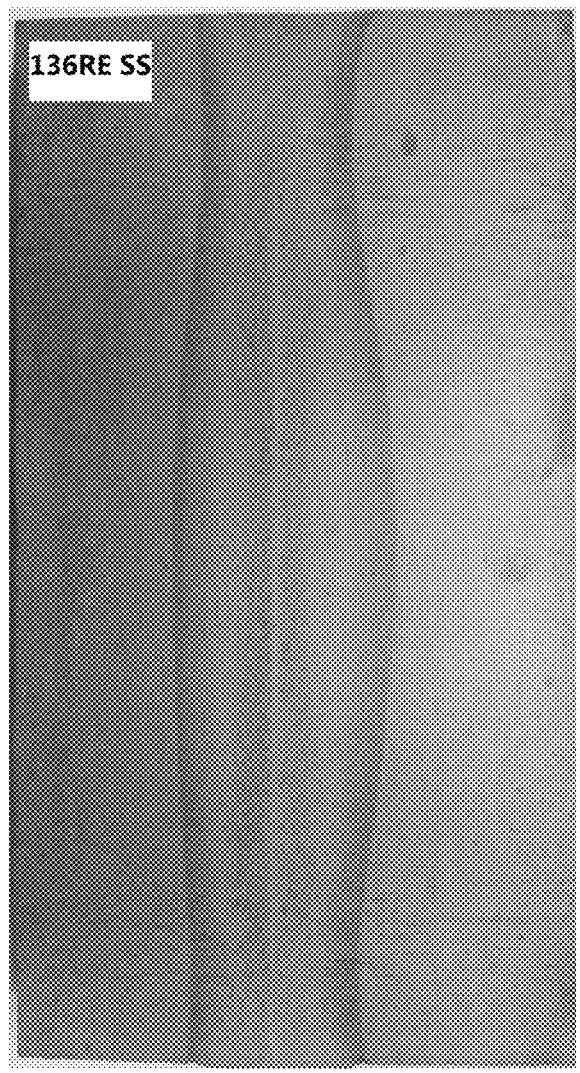
FIG. 1 is the macrostructure of the natural cooling (it means, without post-weld heat treatment) welded joint of rail in the embodiments of the invention.
Figure 2:
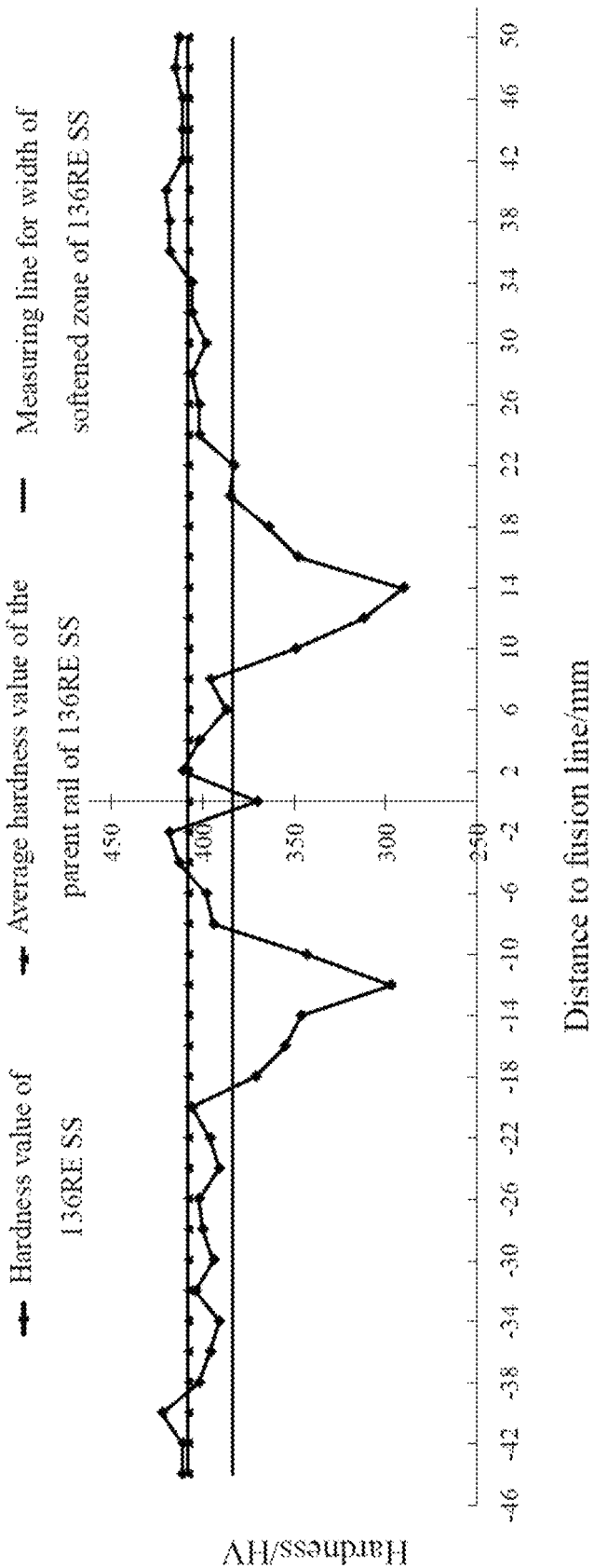
FIG. 2 is the hardness distribution diagram of the longitudinal section at 5.0 mm under the rail running surface of the natural cooling welded joint of the rail of rail in the embodiments of the invention.

FIG. 1 is the macrostructure of the natural cooling welded joint of rail in the examples of the invention, and FIG. 2 is the hardness distribution diagram of the longitudinal section at 5.0 mm under the rail running surface of the natural cooling welded joint in the examples of the invention. The hardness distribution diagram is drawn with EXCLE based on the data obtained through tests conducted using Brinell & Vickers hardness tester at an interval of 2 mm.

It can be seen from FIG. 2 that, based on the center of weld, the width of the softened zone on the left of the joint of the 136RE+SS heat-treated rail is 10.0 mm and that on the right is 11.5 mm, which satisfies the requirement of Australian standard that the width of the softened zone should be lower than 30 mm.

The stability of welding quality can be further improved by controlling the holding force in the forge stage within the range of 25 t-35 t.

Heat treatment can be further carried out for the welded joint after welding. Martensite structure with high hardenability can be avoided for the rail by conducting heat treatment to the welded joint.

During the heat treatment, the welded joint produced after welding is cooled down to below 400° C. in the first time, then heated to 860° C.-940° C., and then cooled until the temperature of the rail running surface of the welded joint is between 410° C.-450° C. in the second time. By adopting the aforementioned heat treatment method, the welding stress can be eliminated and the quality of welded joint of rail can be improved.

EXAMPLES the examples for conducting mobile flash butt welding for 136RE+SS heat-treated rail by using the method in the application are described as follows.

Example 1

In the first stage, i.e. the pre-flash stage when welding the 136RE+SS heat-treated rail by a mobile flash butt welder, the heat input is controlled within 2.1 MJ, the distance within 1.3 mm and the duration within 25.0 s; in the second stage, i.e. the flash stage, the heat input is controlled within 6.2 MJ, the distance within 6.0 mm and the duration within 65.0 s; in the third stage, i.e. the boost stage, the heat input is controlled within 0.4 MJ, the distance within 12.5 mm and the duration within 26.0 s; in the fourth stage, i.e. the upset stage, the heat input is controlled within 0.1 MJ, the distance within 16.3 mm, the upsetting current on time within 0.6 s and the duration within 2.3 s; and in the fifth stage, i.e. the forge stage, the holding force is controlled within 29.8 t and the duration within 14.5 s. In general, the total heat input is controlled with 8.9 MJ, the upsetting distance within 16.5 mm and the total welding duration within 124.0 s, so as to achieve the purpose of controlling welding quality. Detailed data are shown in Table 1.

After the upsetting and shearing, post-weld heat treatment could be carried out for the welding joint obtained. Firstly, the welding joint is cooled down from 1400° C. to 100° C. in a natural way, and then heated in full section by means of medium frequency power supply until the highest temperature of the rail running surface of the welded joint reaches 930° C. An infrared thermometer automatically collects signals sent after the temperature has reached the required temperature and the heating device is powered off automatically and immediately. Then, the rail running surface at the temperature of 840° C. is cooled with air quenching. An air-quenching device is used to accelerate the cooling of the heated zone of the running surface of the welding joint heated to the required temperature, with the nozzle being 45 mm from the rail running surface and the air pressure for air quenching of 0.19 MPa. The infrared thermometer automatically collects and monitors the temperature and the air-quenching device is automatically powered off when the temperature decreased to a final temperature of 410° C. so as to avoid occurrence of martensite structure with high hardenability. The joint is then cooled to room temperature in a natural way.

FIG. 1 is the macrostructure of the natural cooling (it means, without post-weld heat treatment) welded joint of rail in the examples of the invention. The hardness distribution diagram is drawn with EXCLE based on data obtained through tests conducted using Brinell & Vickers hardness tester at an interval of 2 mm.

It can be seen from FIG. 2 that, based on the center of the weld, the width of the softened zone on the left of the joint of the 136RE+SS heat-treated rail is 10.0 mm and that on the right is 11.5 mm, which satisfies the requirement of Australian standard on the width of the softened zone.

The rail obtained after welding in the example can achieve the final objective to meet the requirement of railway standard that 15 welds can pass the drop weight test continuously. Wherein, the deflection to remain unbroken under the first impact is 8.5 mm, and 17 mm under the second impact.

Results of fatigue test, tensile test and slow bend test for the welding joint of the rail are shown respectively in Tables 2, 3 and 4.

TABLE 1

Parameters for Welding Control

| Stages | Average voltage/V | Average current/A | Distance/mm | Duration/s | Heat input/MJ | Others |
|---|---|---|---|---|---|---|
| Pre-flash | 390 | 225 | 1.3 | 25.0 | 2.1 | / |
| Flash | 368 | 271 | 6.0 | 65.0 | 6.2 | Flashing rate 0.09 mm/s |
| Boost | 379 | 47 | 12.5 | 26.0 | 0.4 | Flashing rate 0.5 mm/s Final velocity 0.7 mm/s |
| Upset | / | 868 (maximum current) | 16.3 | 2.3 | 0.1 | Upsetting force 83.5 t Maximum speed 18.2 mm/s |
| Forge | / | / | | 14.5 | | Holding force 29.8 t |
| Overall | / | / | 35.5 | 124.0 | 8.9 | Short-circuit impedance 115.9 µΩ |

Example 2

In the first stage, i.e. the pre-flash stage when welding the 136RE+SS heat-treated rail by a mobile flash butt welder, the heat input is controlled within 2.2 MJ, the distance within 0.7 mm and the duration within 24.8 s; in the second stage, i.e. the flash stage, the heat input is controlled within 6.1 MJ, the distance within 4.0 mm and the duration within 60.0 s; in the third stage, i.e. the boost stage, the heat input is controlled within 0.6 MJ, the distance within 12.0 mm and the duration within 26.0 s; in the fourth stage, i.e. the upset stage, the heat input is controlled within 0.1 MJ, the distance within 16.3 mm, the upsetting current on time within 0.4 s and the duration within 9.3 s; and in the fifth stage, i.e. the forge stage, the holding force is controlled within 30.5 t and the duration within 14.5 s. In general, the total heat input is controlled with 9.0 MJ, the upsetting distance within 16.2 mm and the total welding duration within 124.0 s, so as to achieve the purpose of controlling welding quality.

After the upsetting and shearing, post-weld heat treatment is carried out for the welding joint obtained. Firstly, the welding joint is cooled down from 1420° C. to 120° C. in a natural way, and then heated in full section by means of medium frequency power supply until the highest temperature of the rail running surface of the welded joint reaches 920° C. An infrared thermometer automatically collects signals sent after the temperature has reached the required temperature and the heating device is powered off automatically and immediately. Then, the rail running surface at the temperature of 810° C. is cooled with air quenching. An air-quenching device is used to accelerate the cooling of the heated zone of the running surface of the welding joint heated to the required temperature, with the nozzle being 45 mm from the rail running surface and the air pressure for air quenching of 0.23 MPa. The infrared thermometer automatically collects and monitors the temperature and the air-quenching device is automatically powered off when the temperature of the rail running surface of the weld decreased to a final temperature of 420° C., so as to avoid occurrence of martensite structure with high hardenability. The joint is then cooled to room temperature in a natural way.

The welding joint of the rail obtained in the example has consistent quality. The hardness of the longitudinal section at 5 mm under the rail running surface of the joint can meet properties of the parent rail for over 90% 136RE+SS heat-treated rails, and the width of the softened zone on either side is both controlled within 20 mm. The rail obtained after welding can achieve the final objective to meet the requirement of railway standard that 15 welds can pass the drop weight test continuously.

Results of fatigue test and slow bend test for the welding joint of the rail are shown respectively in Tables 2 and 4.

Example 3

In the first stage, i.e. the pre-flash stage when welding the 136RE+SS heat-treated rail by a mobile flash butt welder, the heat input is controlled within 2.2 MJ, the distance within 0.9 mm and the duration within 24.8 s; in the second stage, i.e. the flash stage, the heat input is controlled within 5.8 MJ, the distance within 5.6 mm and the duration within 60.0 s; in the third stage, i.e. the boost stage, the heat input is controlled within 0.5 MJ, the distance within 12.5 mm and the duration within 26.0 s; in the fourth stage, i.e. the upset stage, the heat input is controlled within 0.1 MJ, the distance within 16.4 mm, the upsetting current on time within 0.4 s and the duration within 7.5 s; and in the fifth stage, i.e. the forge stage, the holding force is controlled within 30.1 t and the duration within 14.3 s. In general, the total heat input is controlled with 8.9 MJ, the upsetting distance within 16.4 mm and the total welding duration within 124.0 s, so as to achieve the purpose of controlling welding quality.

After the upsetting and shearing, post-weld heat treatment is carried out for the welding joint obtained. Firstly, the welding joint is cooled down from 1380° C. to room temperature in a natural way, and then heated in full section by means of medium frequency power supply until the highest temperature of the rail running surface of the welded joint reaches 900° C. An infrared thermometer automatically collects signals sent after the temperature has reached the required temperature and the heating device is powered off automatically and immediately. Then, the rail running surface at the temperature of 830° C. is cooled with air quenching. An air-quenching device is used to accelerate the cooling of the heated zone of the running surface of the welding joint heated to the required temperature, with the nozzle being 50 mm from the rail running surface and the air pressure for air quenching of 0.25 MPa. The infrared thermometer automatically collects and monitors the temperature and the air-quenching device is automatically powered off when the temperature of the rail running surface of the weld decreased to a final temperature of 440° C., so as to avoid occurrence of martensite structure with high hardenability. The joint is then cooled to room temperature in a natural way.

The welding joint of the rail obtained in the example has consistent quality. The hardness of the longitudinal section at 5 mm under the rail running surface of the joint can meet properties of the parent rail for over 90% 136RE+SS heat-treated rails, and the width of the softened zone on either side is both controlled within 20 mm. The rail obtained after welding can achieve the final objective to meet the requirement of railway standard that 15 welds can pass the drop weight test continuously.

Results of fatigue test and slow bend test for the welding joint of the rail are shown respectively in Tables 2 and 4.

Example 4

In the first stage, i.e. the pre-flash stage when welding the 136RE+SS heat-treated rail by a mobile flash butt welder, the heat input is controlled within 2.1 MJ, the distance within 1.4 mm and the duration within 24.9 s; in the second stage, i.e. the flash stage, the heat input is controlled within 5.9 MJ, the distance within 6.2 mm and the duration within 59.9 s; in the third stage, i.e. the boost stage, the heat input is controlled within 0.6 MJ, the distance within 10.5 mm and the duration within 26.1 s; in the fourth stage, i.e. the upset stage, the heat input is controlled within 0.1 MJ, the distance within 16.7 mm, the upsetting current on time within 0.4 s and the duration within 4.2 s; and in the fifth stage, i.e. the forge stage, the holding force is controlled within 28.0 t and the duration within 14.4 s. In general, the total heat input is controlled with 8.8 MJ, the upsetting distance within 16.7 mm and the total welding duration within 124.0 s, so as to achieve the purpose of controlling welding quality.

After the upsetting and shearing, post-weld heat treatment is carried out for the welding joint obtained. Firstly, the welding joint is cooled down from 1500° C. to 200° C. in a natural way, and then heated in full section by means of medium frequency power supply until the highest temperature of the rail running surface of the welded joint reaches 910° C. An infrared thermometer automatically collects signals sent after the temperature has reached the required temperature and the heating device is powered off automatically and immediately. Then, the rail running surface at the temperature of 800° C. is cooled with air quenching. An air-quenching device is used to accelerate the cooling of the heated zone of the running surface of the welding joint heated to the required temperature, with the nozzle being 30 mm from the rail running surface and the air pressure for air quenching of 0.10 MPa. The infrared thermometer automatically collects and monitors the temperature and the air-quenching device is automatically powered off when the temperature of the rail running surface of the weld decreased to a final temperature of 420° C., so as to avoid occurrence of martensite structure with high hardenability. The joint is then cooled to room temperature in a natural way.

The welding joint of the rail obtained in the example has consistent quality. The hardness of the longitudinal section at 5 mm under the rail running surface of the joint can meet properties of the parent rail for over 90% 136RE+SS heat-treated rails, and the width of the softened zone on either side is both controlled within 20 mm. The rail obtained after welding can achieve the final objective to meet the requirement of railway standard that 15 welds can pass the drop weight test continuously.

Results of slow bend test for the welding joint of the rail shown in Table 4.

TABLE 2

Fatigue Test Results

| No. | Force/kN | Stress condition | Maximum stress of rail foot/ MPa | Maximum deflection/ mm | Loading rate kN/s | Test results |
|---|---|---|---|---|---|---|
| Example 1 | 2256 Broken | The rail foot is under tensile stress | 1217 | 15.3 | 64 | Broken, Qualified |
| Example 2 | 2400 Unbroken | | 1294 | 19.1 | 46 | Unbroken, Qualified |
| Example 3 | 2320 Broken | | 1251 | 16.2 | 52.7 | Broken, Qualified |

TABLE 3

Tensile Test Results

| No. | Location of Samples | Rp0.2/MPa | Rm/MPa | A/% | Z/% |
|---|---|---|---|---|---|
| Example 1 | Rail head | 710 | 1107 | 7.5 | 46 |
| | | 696 | 1106 | 7.5 | 44 |
| | | 702 | 1113 | 7.0 | 44 |
| | Rail web | 690 | 1067 | 8.5 | 46 |
| | | 722 | 1031 | 2.5 | 2 |
| | | 670 | 1048 | 10.0 | 45 |
| | Rail foot | 688 | 1098 | 8.5 | 16 |
| | | 688 | 1087 | 8.5 | 44 |
| | | 695 | 1097 | 8.5 | 47 |

TABLE 4

Slow Bend Test Results

| Inspection Items | Example 1 | Example 2 | Example 3 | Example 4 |
|---|---|---|---|---|
| Deflection to remain unbroken under the first impact/mm | 7.9 | 8.8 | 8.5 | 8.0 |
| Deflection to remain unbroken under the second impact/mm | 15.9 | 17.0 | 17.0 | 16.4 |
| Fatigue cycles/ 10000 | >201.2 | >201.1 | >201.2 | / |

While the invention has been described in detail and with reference to specific examples thereof, it will be apparent to one skilled in the art that various changes and modifications can be made therein without departing from the spirit and scope thereof.

What is claimed is:

1. A mobile flash butt welding method for a 136RE+SS heat-treated rail, said method comprising conducting on the 136RE+SS heat-treated rail a pre-flash stage, a flash stage, a boost stage, an upset stage and a forge stage, with a total heat input of 7.1 MJ-10.0 MJ, a total duration of 110 s-135 s and an upsetting distance of 12.8 mm-16.7 mm during the welding method; wherein, in the pre-flash stage, a pre-flash stage heat input is 1.9 MJ-2.2 MJ, a pre-flash stage distance is 0.1 mm-1.2 mm and a pre-flash stage duration is 22.5 s-25 s; in the flash stage, a flash stage heat input is 5.0 MJ-6.0 MJ, a flash stage distance is 1.0 mm-5.0 mm and a flash stage duration is 48.0 s-52.0 s; in the boost stage, a boost stage heat input is 0.3 MJ-1.2 MJ, a boost stage distance is 13.1 mm-15.2 mm and a boost stage duration is 29.5 s-32.0 s; in the upset stage, an upset stage heat input is 0.1 MJ-0.3 MJ, an upset stage distance is 13.7 mm-16.0 mm and an upset stage duration is 2.0 s-9.9 s; and in the forge stage, a forge stage duration is 12.8 s-14.5 s.

2. The mobile flash butt welding method for 136RE+SS heat-treated rail according to claim 1, wherein a holding force is 25 t-35 t in the forge stage.

3. The mobile flash butt welding method for 136RE+SS heat-treated rail according to claim 1, wherein heat treatment can be further carried out for welds after welding.

4. The mobile flash butt welding method for 136RE+SS heat-treated rail according to claim 1, wherein during the heat treatment, a welded joint produced after welding is cooled down to below 400° C. in a first time, then heated to 860° C.-940° C., and then cooled until a temperature of the rail running surface of the welded joint is between 410° C.-450° C. in a second time.

\* \* \* \* \*

UNITED STATES PATENT AND TRADEMARK OFFICE
CERTIFICATE OF CORRECTION

PATENT NO. : 10,870,165 B2  
APPLICATION NO. : 16/111821  
DATED : December 22, 2020  
INVENTOR(S) : Xin Lu et al.

Page 1 of 1

It is certified that error appears in the above-identified patent and that said Letters Patent is hereby corrected as shown below:

On the Title Page

Item (30) Foreign Application Priority Data, the application number "(CN) ........................ 2017 1 0771298" should read -- (CN) ........................ 2017 1 0771298.X --.

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*